US012083524B2

(12) United States Patent
(10) Patent No.: US 12,083,524 B2
(45) Date of Patent: Sep. 10, 2024
Lutoslawski et al.

(54) CENTRIFUGAL PULVERIZING MILL

(71) Applicant: TORXX KINETIC PULVERIZER LIMITED, Hamilton (BM)

(72) Inventors: Jaroslaw Lutoslawski, Bradford (CA); Mark Christopher Lugowski, Scarborough (CA)

(73) Assignee: TORXX KINETIC PULVERIZER LIMITED, Hamilton (BM)

( * ) Notice: Subject to any disclaimer, the term of this patent is extended or adjusted under 35 U.S.C. 154(b) by 476 days.

(21) Appl. No.: 17/233,132

(22) Filed: Apr. 16, 2021

(65) Prior Publication Data

US 2021/0229105 A1 Jul. 29, 2021

Related U.S. Application Data

(62) Division of application No. 15/405,383, filed on Jan. 13, 2017, now abandoned.

(60) Provisional application No. 62/279,251, filed on Jan. 15, 2016.

(51) Int. Cl.
*B02C 13/18* (2006.01)
*B02C 13/28* (2006.01)
*B02C 13/31* (2006.01)

(52) U.S. Cl.
CPC .......... *B02C 13/18* (2013.01); *B02C 13/2804* (2013.01); *B02C 13/31* (2013.01); *B02C 2013/2808* (2013.01); *B02C 2201/06* (2013.01)

(58) Field of Classification Search
CPC . B02C 13/18; B02C 13/2804; B02C 13/2812; B02C 13/2808; B02C 13/31; B02C 13/09; B02C 13/14; B02C 13/16; B02C 13/26; B02C 13/28
USPC ........ 241/188.1, 189.1, 191, 47, 57, 62, 197
See application file for complete search history.

(56) References Cited

U.S. PATENT DOCUMENTS

| | | | |
|---|---|---|---|
| 375 A | 9/1837 | Smith |
| 7,000 A | 1/1850 | Goshon |
| 56,672 A | 7/1866 | Heneage |
| 125,172 A | 4/1872 | Chichester |
| 134,513 A | 1/1873 | Chichester |
| 248,923 A | 11/1881 | Dechamp |
| 277,138 A | 5/1883 | Knight |
| 441,372 A | 11/1890 | Morse |
| 499,795 A | 6/1893 | Morse |
| 964,102 A | 7/1910 | Gordon |
| 1,048,869 A | 12/1912 | Pitcairn |
| 1,178,386 A | 4/1916 | Edwards |
| 1,197,888 A | 9/1916 | Adams |

(Continued)

FOREIGN PATENT DOCUMENTS

| | | |
|---|---|---|
| CA | 2125797 A1 | 12/1995 |
| CA | 2147666 A1 | 10/1996 |

(Continued)

*Primary Examiner* — Nhat Chieu Q Do
(74) *Attorney, Agent, or Firm* — Brooks Kushman P.C.

(57) ABSTRACT

A pulverizer has arms connected to a vertically oriented rotating shaft at hubs. The arms are angled relative to radians extending from the shaft to be canted or offset. Pads can be oversized relative to the arms while being one of coplanar with the arms or recessed while possibly also having their radially inward face(s) angled to assist in resisting catching material thereon. A mechanical fuse connection can assist in connecting arms to the hub to prevent dangerous situations as well.

18 Claims, 9 Drawing Sheets

(56) References Cited

U.S. PATENT DOCUMENTS

| | | | |
|---|---|---|---|
| 1,212,418 | A | 1/1917 | Sturtevant |
| 1,212,419 | A | 1/1917 | Sturtevant |
| 1,300,192 | A | 4/1919 | Overstrom |
| 1,608,717 | A | 11/1926 | Bell |
| 1,636,033 | A | 7/1927 | Agnew |
| 1,656,756 | A | 1/1928 | Payne |
| 1,669,239 | A | 5/1928 | Grindle |
| 1,758,010 | A | 5/1930 | Pettinos |
| 1,798,465 | A | 3/1931 | Grindle |
| 1,911,193 | A | 5/1933 | Hill |
| 1,935,344 | A | 11/1933 | Andrews et al. |
| 2,012,694 | A | 8/1935 | Runyan |
| 2,092,307 | A | 9/1937 | Gaffney |
| 2,093,703 | A | 9/1937 | Blodgett |
| 2,130,064 | A | 9/1938 | Bucky |
| 2,164,409 | A | 7/1939 | Johnson |
| 2,171,525 | A | 9/1939 | Ainsa |
| 2,248,927 | A | 7/1941 | Ainsa |
| 2,259,939 | A | 10/1941 | Garcia |
| 2,275,595 | A | 3/1942 | Schwartz |
| 2,355,784 | A | 8/1944 | Dondlinger |
| 2,367,906 | A | 1/1945 | Wall et al. |
| 2,392,958 | A | 1/1946 | Tice |
| 2,546,286 | A | 3/1951 | Zakel |
| 2,562,560 | A | 7/1951 | MacArtney |
| 2,592,994 | A | 4/1952 | Ahlmann |
| 2,595,117 | A | 4/1952 | Ahlmann |
| 2,639,747 | A | 5/1953 | Burn et al. |
| 2,700,512 | A | 1/1955 | Denovan et al. |
| 2,707,594 | A | 5/1955 | Moore |
| 2,709,552 | A | 5/1955 | Lecher |
| 2,713,977 | A | 7/1955 | Noll |
| 2,750,120 | A | 6/1956 | Pallmann |
| 2,847,168 | A | 8/1958 | Smiley |
| 2,917,248 | A | 12/1959 | Krug et al. |
| 2,919,864 | A | 1/1960 | Parmele |
| 2,937,815 | A | 5/1960 | Eirich et al. |
| 2,940,676 | A | 6/1960 | Brake |
| 2,981,489 | A | 4/1961 | Hannum, Jr. |
| 2,992,783 | A | 7/1961 | Wirth et al. |
| 3,015,392 | A | 1/1962 | Rozsa et al. |
| 3,062,459 | A | 11/1962 | Dearing |
| 3,065,919 | A | 11/1962 | Le Roy et al. |
| 3,071,330 | A | 1/1963 | Jackering |
| 3,123,115 | A | 3/1964 | Howard |
| 3,155,326 | A | 11/1964 | Rhodes |
| 3,160,354 | A | 12/1964 | Le Roy |
| 3,180,582 | A | 4/1965 | Danyluke |
| 3,207,447 | A | 9/1965 | Whitham |
| 3,210,016 | A | 10/1965 | Sevin et al. |
| 3,302,895 | A | 2/1967 | Ryder |
| 3,326,476 | A | 6/1967 | De Los Santos Izquierdo |
| 3,329,350 | A | 7/1967 | Wisgerhof et al. |
| 3,346,203 | A | 10/1967 | Danyluke |
| 3,426,673 | A | 2/1969 | Miner et al. |
| 3,474,974 | A | 10/1969 | Wood |
| 3,490,704 | A | 1/1970 | Bourne et al. |
| 3,555,996 | A | 1/1971 | Schwarz et al. |
| 3,615,008 | A | 10/1971 | Alpha |
| 3,834,631 | A | 9/1974 | King |
| 3,873,034 | A | 3/1975 | Iwahori et al. |
| 3,887,141 | A | 6/1975 | Francis |
| 3,946,953 | A | 3/1976 | Hato |
| 3,976,002 | A | 8/1976 | Gerlach |
| 3,987,970 | A | 10/1976 | Burkett |
| 4,030,670 | A | 6/1977 | Abernathy |
| 4,098,466 | A | 7/1978 | MacElvain et al. |
| 4,144,167 | A | 3/1979 | Burkett et al. |
| 4,146,185 | A | 3/1979 | Schober |
| 4,151,794 | A | 5/1979 | Burkett |
| 4,151,959 | A | 5/1979 | Deister |
| 4,202,078 | A | 5/1980 | Malinak |
| 4,493,459 | A | 1/1985 | Burkett |
| 4,531,461 | A | 7/1985 | Sayler et al. |
| 4,593,861 | A | 6/1986 | Blakley et al. |
| 4,637,561 | A | 1/1987 | Edberg |
| 4,690,338 | A | 9/1987 | Sayler et al. |
| 4,886,216 | A | 12/1989 | Goble |
| 4,989,796 | A | 2/1991 | Eide |
| 5,067,661 | A | 11/1991 | Eide |
| 5,184,781 | A | 2/1993 | Andela |
| 5,192,029 | A | 3/1993 | Harris |
| 5,205,500 | A | 4/1993 | Eide |
| 5,285,973 | A | 2/1994 | Goforth et al. |
| 5,379,951 | A | 1/1995 | Hughes |
| 5,680,994 | A * | 10/1997 | Eide ...................... B02C 13/286 241/154 |
| 5,685,500 | A * | 11/1997 | Eide ........................ B02C 13/18 241/154 |
| 5,772,134 | A | 6/1998 | Bouldin et al. |
| 5,839,671 | A | 11/1998 | Sand et al. |
| 6,024,307 | A | 2/2000 | Sand et al. |
| 6,135,370 | A | 10/2000 | Arnold |
| 6,179,231 | B1 | 1/2001 | Csendes |
| 6,227,473 | B1 | 5/2001 | Arnold |
| 6,726,133 | B2 | 4/2004 | Hahn et al. |
| 7,712,692 | B2 | 5/2010 | Hall et al. |
| 7,950,601 | B2 | 5/2011 | Watts |
| 8,020,791 | B2 | 9/2011 | Knueven et al. |
| 8,267,337 | B2 | 9/2012 | Webb |
| 8,678,306 | B2 | 3/2014 | Watts |
| 8,931,721 | B2 | 1/2015 | Jensen et al. |
| 9,205,431 | B2 | 12/2015 | Anderson |
| 9,498,780 | B2 | 11/2016 | Watts et al. |
| 9,707,564 | B2 | 7/2017 | Mogan et al. |
| 9,751,087 | B2 | 9/2017 | Watts et al. |
| 9,943,851 | B2 | 4/2018 | Watts |
| 2012/0205476 | A1 * | 8/2012 | Eblen ...................... B02C 13/28 241/193 |
| 2013/0233955 | A1 * | 9/2013 | Morrow .................. B02C 13/28 241/189.1 |
| 2014/0077009 | A1 | 3/2014 | Watts et al. |
| 2015/0034747 | A1 | 2/2015 | Watts et al. |

FOREIGN PATENT DOCUMENTS

| | | | | |
|---|---|---|---|---|
| CA | 2279301 | A1 * | 1/2001 | ......... B02C 13/1814 |
| CN | 103934085 | A | 7/2014 | |
| CN | 105833944 | A | 8/2016 | |
| EP | 0202424 | B1 | 8/1990 | |
| EP | 0525362 | B1 | 10/1994 | |
| WO | 1989008752 | A1 | 9/1989 | |
| WO | 1993002797 | A1 | 2/1993 | |
| WO | 1998055234 | A1 | 12/1998 | |
| WO | 2008131477 | A1 | 11/2008 | |

* cited by examiner

CENTRIFUGAL PULVERIZING MILL

CROSS-REFERENCE TO RELATED APPLICATIONS

This application is a division of U.S. application Ser. No. 15/405,383, filed Jan. 13, 2017, which claims the benefit of U.S. Provisional Application No. 62/279,251, filed Jan. 15, 2016, the disclosures of which are incorporated in their entirety by reference herein.

TECHNICAL FIELD

The present invention relates to a refuse treatment machine and more particularly to a centrifugal pulverizing mill for treatment of materials, for example refuse for use in managing waste and recycling or other materials, including pulverizing, aerating, homogenizing and/or separating.

BACKGROUND

Solid materials such as garbage, rubbish or other solid materials have been collected by trucks and transported for disposal or recycling, or repurposing for many years.

Burkett developed a centrifugal mill sometime around in the mid-1970s and ended up with U.S. Pat. No. 3,987,970 and others.

The applicant's predecessor-in-interest filed Canadian Patent Application Nos. 2,125,797 and 2,147,666 for use with various equipment and methods for pulverizing rock and remediating soil utilizing an improved pulverizer configuration.

Still others have commercialized an embodiment of the Burkett mill and are trying to sell that design in the marketplace today. However, when attempting to build a Burkett mill with improvements, the applicant discovered there were components of that basic design which could be improved.

SUMMARY

It is an object of the present invention to provide an improved centrifugal mill also known as a vertical gyroscopic mill or pulverizer.

It is another object of many embodiments of the present invention to provide an improved pulverizer having a mechanical fuse or at least an improvement designed to allow an arm to move out of the way rather than being ripped off and/or seriously damaged as a result of striking a particularly unyielding object. Sometimes unyielding materials are placed m pulverizers like fire hydrants or other items that are unyielding when they contact surfaces.

It is another object of many embodiments of the present invention to provide an improved pulverizer having arms constructed and designed to preferentially absorb impact and/or move out of the way rather than fail in the event of striking too resistant of an object.

It is another object of many embodiments of the present invention to provide an antiwrapping arm construction which preferentially sheds objects which otherwise might become fouled on the arm.

It is another object of many embodiments of the present invention to provide an improved raked arm configuration which is believed to assist in preventing fouling of the arm.

It is another object of many embodiments of the present invention to provide an improved arm pad which preferentially reduces the likelihood of material wrapping about the arm and/or arm pad.

It is another object of many embodiments of the present invention to provide an improved arm/arm pad combination which preferentially reduces a likelihood of wrapping.

It is another object of many embodiments of the present invention to provide an improved hub/arm interface which provides a more cost effective way to connect arms to hubs while still allowing the arms to provide a fail-safe style connection for many embodiments while also providing a way to reduce manufacturing costs.

One or more adjustable shelves can be provided for many embodiments to increase the residence time of material treated inside the pulverizer of many embodiments.

Adjustment of shelf location(s) affects material reduction and/or residence time for many embodiments.

Changing the speed of the arm rotation with shelf height has been found to increase efficiency for at least some processes.

Accordingly, in accordance with at least some presently preferred embodiments of the present invention, an improved pulverizer construction is provided in which the arms take on new constructions not previously provided in pulverizers.

Specifically, the arms are designed so that upon striking a particularly difficult object (the applicant has had an arm strike a brake rotor before which sheared off some of the pads), the arms preferably move out of the way before being broken (or hopefully before being seriously damaged). Arms or arm pads breaking in pulverizers before can create a significant hazard as the tips of the arms are normally moving through the pulverizer at over 200 miles per hour. If a broken arm were to breach the cylindrical housing, that could create a significant safety concern around the pulverizer. Accordingly, the applicant has designed a system whereby the arms can preferentially rotate out of the way before reaching a breaking point upon contacting a sufficiently immovable or resistant object. This can be performed with a mechanical fuse mechanism or other mechanism, to allow the arm to rotate out of the way before an arm and/or arm pad fails such as upon reaching a predetermined force before failure force to "fail safe." A safety margin of ½ of failure force for the predetermined force may be used or other factor.

In addition to a "fail safe" feature arms of the presently preferred embodiment of the present invention, some preferred embodiments may also and/or alternatively provide an ability to provide raked arms and/or otherwise provide anti-wrapping tendencies.

Specifically, with a raked arm, instead of extending radially along radial axes from the shaft (i.e., radial axes), the arms are preferably angled relative to those axes at least about 5 degrees if not up to about 90 degrees, but more preferably in a range of about 5 to about 20 degrees if not at about 15 degrees. By allowing the arm to be raked (off of radial axes) in this manner, material tends to shed off the end of the arms through centrifugal force rather than becoming an entanglement thereabout (plastic fibers, straps, hose, wires and textiles have been found to have a tendency to wrap as well as other items on the Burkett arm configuration). Additionally, if one looks at the prior art, such as Canadian Patent Application No. 2,147,666 or even some of the really old technology such as U.S. Pat. No. 1,636,033, one will see that the pads are bolted to a front face of the radially extended arms which provides a catch point at the radially inwardly facing surface of the arm pads.

Instead of providing this construction, the applicant has found that for many embodiments recessing the pads into the arms can be desirable relative to the front face of the arms or at least providing them flush so that material at the front faces to shed material contacting the arm. In the event contact occurs, material tends to shed off the arm rather than be entrapped there against. In a similar non-wrapping effort, the arm pads may also have angled radially interior upper and lower edges to assist in this endeavor. Notches may also be utilized internal to the arms so as to be able to accept portions of the arm pad and/or relieve stress.

The hub where the arms connect to the shaft can also be improved upon over prior designs. In prior art designs, a cylindrical piece of metal as a hub was machined to effectively permit recessed placement of the arms internal to a said cylindrical piece so the upper surface of the arm was flush with the upper surface of the hub. This was a particularly expensive way to construct the hub and arm construction.

Accordingly, instead of that style construction, a sandwich style construction is provided where the arms are disposed between two plates and then preferably retained therebetween. In addition, a spacing plate can then provide to space over the pin heads holding the arms to the plates. A cover plate can then cover the spacer plates. The spacer plates preferably provide a semi-circular jigsaw style construction so that they can connect together to provide a rigid ring connection when installed, but also be able to be assembled in a relatively easy manner about the rotating shaft drive of the pulverizer.

One or more adjustable shelves can be provided for many embodiments which can be mechanized for adjusting height relative to the arms. The adjustable shelf feature, if utilized, can be coupled with a variable drive frequency of the variable speed motor for additional effects.

Still other embodiments may incorporate some, or even all, of the features described above.

BRIEF DESCRIPTION OF THE DRAWINGS

The particular features and advantages of the invention as well as other objects will become apparent from the following description taken in connection with the accompanying drawings in which.

DETAILED DESCRIPTION

Figure 1:
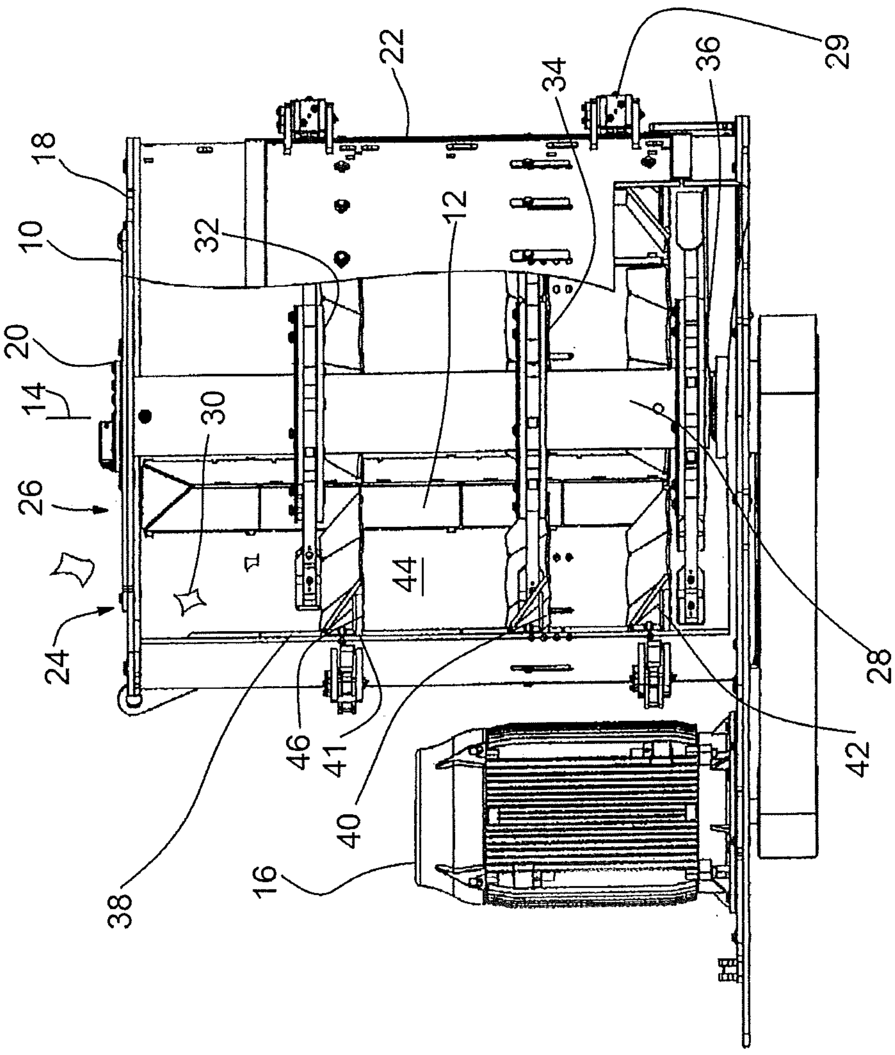
FIG. 1 is a sectional view of a pulverizer constructed in accordance with a presently preferred embodiment of the present invention.

FIG. 1 shows a pulverizer 10 of the presently preferred embodiment of the present invention. Specifically, a rotating shaft 12 is shown extending along a vertical axis 14. The shaft 12 can be driven by a motor 16 such as being belt driven, chain driven, gear or belt driven such as by belt 18 to driver 20 (such as a shaft pulley being the "driver" pulley) which could be a gear, pulley or other cooperating system. Of course, the motor 16 may be directly coupled to shaft 12 as would be understood by those of ordinary skill in the art as well.

Pulverizer 10 typically has a drum or cylindrical housing 22 which can be constructed in various ways. The housing 22 preferably has a head section 24 with an input port 26 which permits the introduction of material to be ground inside the housing 22 as will be described below.

The shaft 12 is preferably rotated about the axis 14 by the motor 16 and is suspended by bearings 28 for rotation such as is shown. Bearing 28 may be supported in a variety of ways as would be understood by those of ordinary skill in the art. Output is discharged via discharger port 25.

As the material, illustrated as particulate 30, although it could be virtually any material including, but not limited to, railway ties, concrete, shingles, organic waste, municipal waste, glass, tree portions, and/or other waste or even other non-waste materials, is directed into the inlet 26, the rotors 32, 34 and 36, each of which having arms as described below extending from hubs rotate such as up to 1,050 rpm to generate vortices inside the pulverizer 10 with deflectors 38 along with the shelves 40, 41, 42 to direct the vortices so that the vortices create a rather crushing environment inside of the pulverizer 10. The illustrated design provides six counter rotating vortices. Other designs may have other air flow characteristics.

Accordingly, the particulate 30 generally becomes smaller and smaller principally due to the particulate contacting itself inside the pulverizer 10. Of course, some particulate 30 does contact the arms 32, 34, 36 as well as deflectors 38 as well as shelves 40, 42 and interior walls 44 of the housing 22 from time to time, but it is believed that the majority of the diminution in size is the result of the particulate 30 contacting itself. The speed at the end of the arms 46 can approach roughly 200 meters per second (or more) and thus separate vortices are created. Material contacting where the vortices intersect is quite a significant experience.

In the prior art, the arms were countersunk into a solid hub which was connected to the shaft to provide a planar upper surface. The applicant discovered that in this design, the arms did not have any way to give when contacting a virtually immovable object. In fact, the applicant had the misfortune of having pads stripped off of the arms 32, 34, 36 (which were extremely high quality metal) to then rotate at extremely high speeds through the pulverizer, thus damaging the internal surface of the housing as well as deflectors 38 and arms and other arm pads and also the arms.

Figure 2:
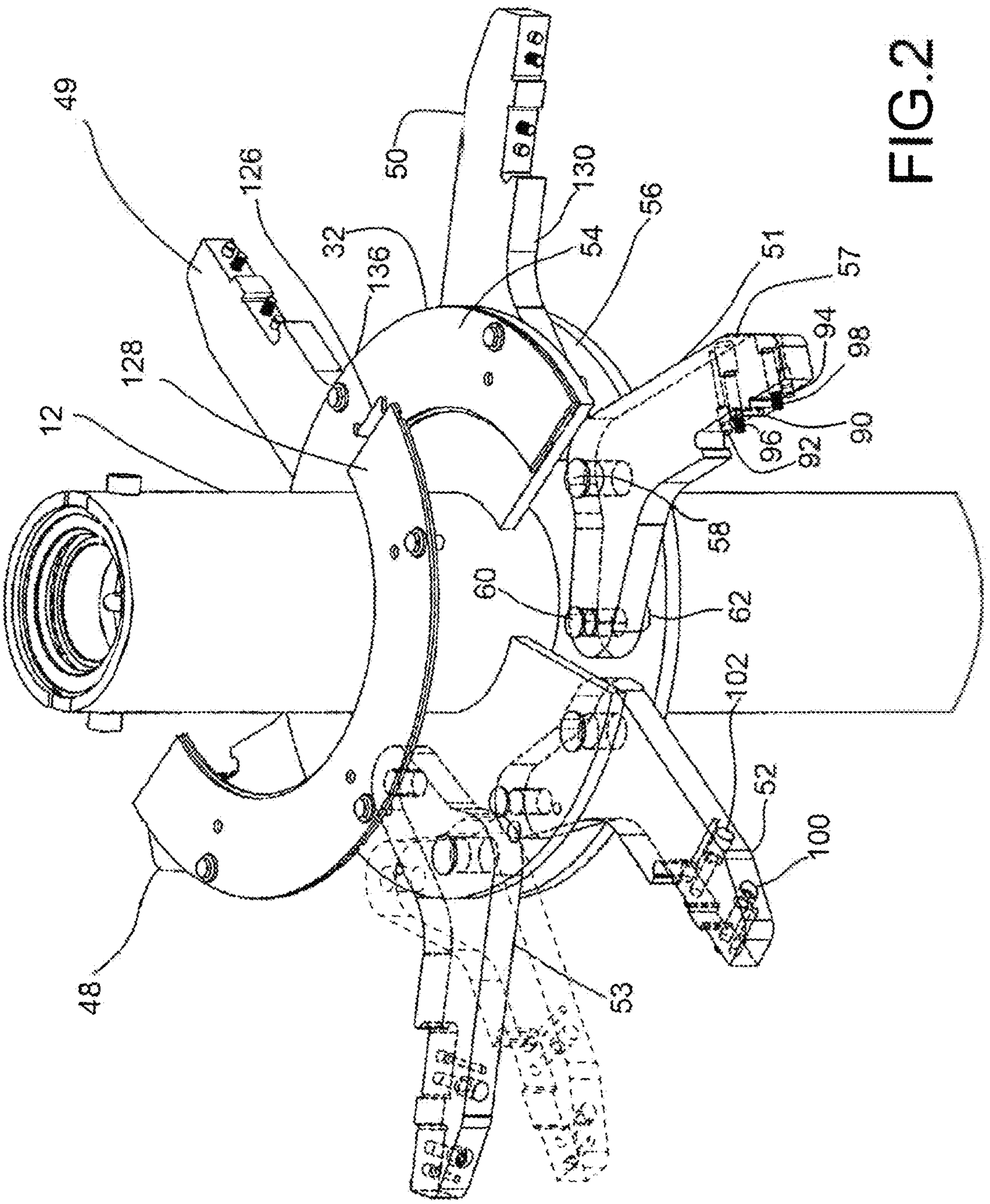
FIG. 2 is a front perspective view of a portion of the pulverizer shown in FIG. 1.

Arms such as arm 48, 49, 50, 51, 52 and 53 are shown in detail in FIG. 2 and others of the presently preferred design. The basic arm construction can be the same or different amongst the various arms 48-53. FIG. 2 shows the arms 48-53 connected to a hub such as hub 32 in a different manner than prior art hubs. Specifically, hub 32 connects to shaft 12 with top and bottom plates 54, 56. The top and bottom plates 54, 56 effectively sandwich the arms 48-53 therebetween. The arms 48-53 connect to the top and bottom plates such as with first and second pins 58, 60. This connection secures the arms 48-53 in a desired position relative to the plates 54, 56. Other connections could be used with other embodiments.

As illustrated in FIG. 2, the arms 48-53 can extend radially away from shaft 12 as occurs with the prior art.

Figure 5A:
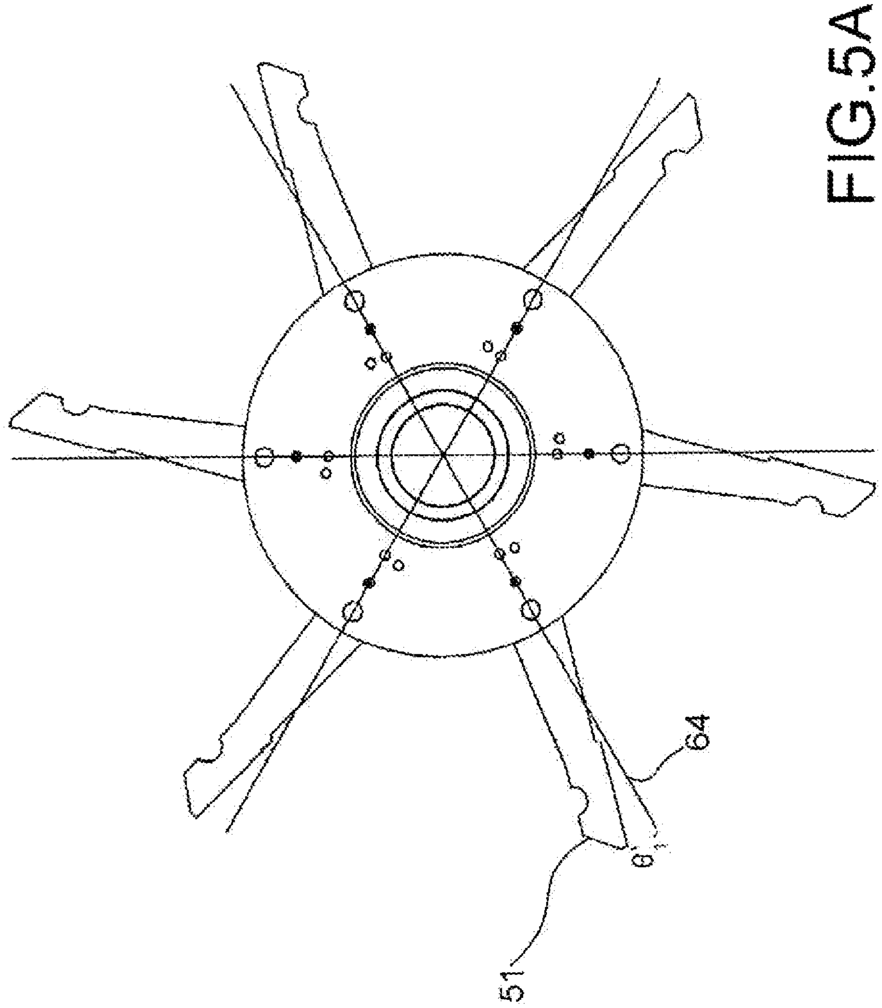
FIG. 5A is a top plan view taken along the line A-A of FIG. 1 showing a first canted angle.

Alternatively, FIG. 5A shows an alternatively preferred configuration in which the arms 48-53 are oriented slightly differently, namely, with the second pin 60 being located in outer bore 62 instead of in an inner bore 60 as illustrated in FIG. 2 whereby the arms 48-53 are now raked at a first angle (i.e., backwardly angled relative to radial axis such as about 5 to about 90 degrees and more particularly, about 5 to about 30 degrees such as at about 15 degrees as illustrated in FIG. 5A with a first canted angle $\theta_1$ at about 15 degrees relative to a radial axis 64 as would occur if the second pin 60 is located in the outer bore 62 to achieve the 15 degree rake as shown in FIG. 5A). Other ways to rake the arms 48-53 also could be employed with other embodiments.

Raking has an advantage in that when the arms 48-53 are rotating when material which might otherwise become entangled about the arm 48-53 encounters the angular nature of the rake, then the material tends to be directed off an end of the arms 48-53 rather than tangling about the affected arm 48-53.

Figure 5B:
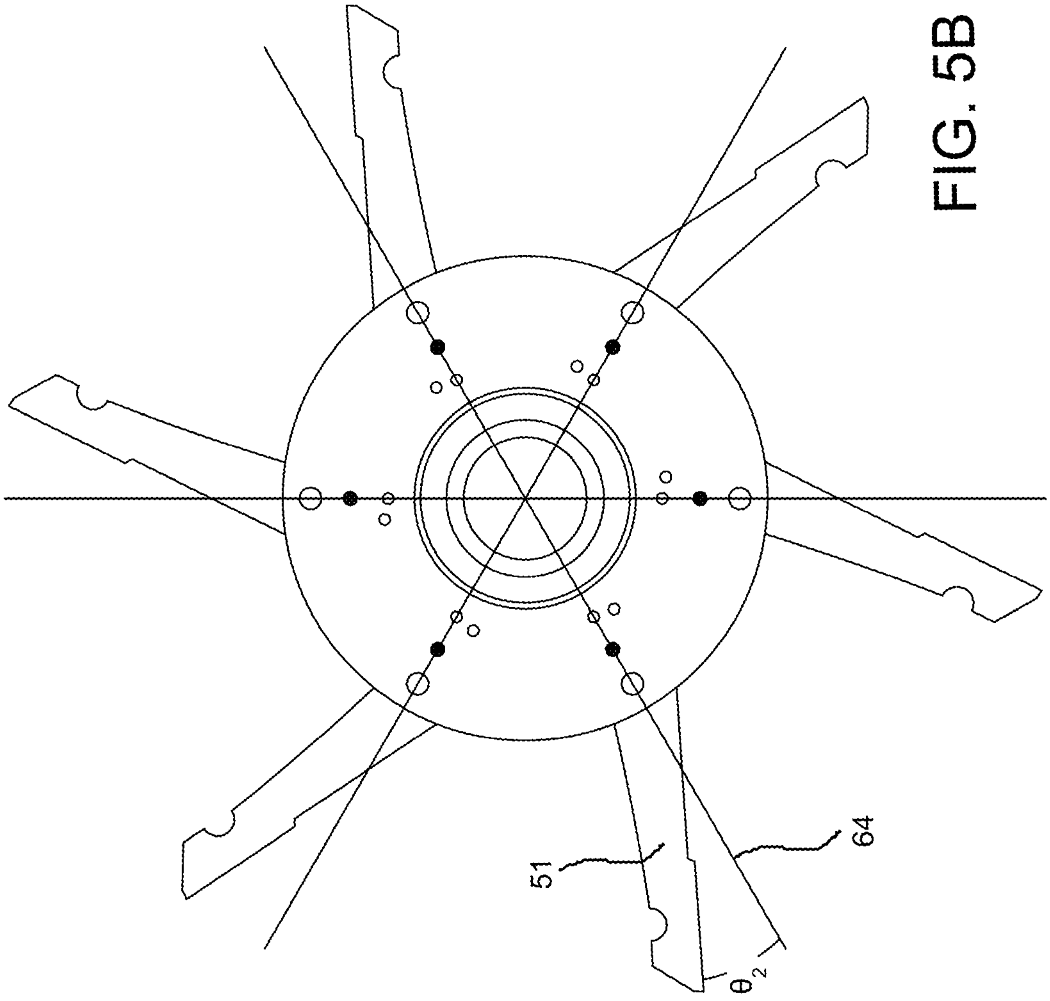
FIG. 5B is a top plan view taken along the line A-A of FIG. 1 showing a second canted angle.

By providing the configuration shown in FIG. 2, the applicant can select at least one of two different angular positions of the arms 48-53 relative to the radial axis 64. For example, as shown in FIG. 5A, the arms 48-53 are orientated at a first canted angle $\theta_1$ relative to a radial axis 64, and, as shown in FIG. 5B, the arms 48-53 are orientated at a second canted angle $\theta_2$ relative to a radial axis 64. Other embodiments may have even more angular relationship choices and/or other angular relationship selection capability depending on which how the arms 48-53 and/or plates 54, 56 attach.

In addition to raked arms 48-53, the applicant has provided first and second pins 58, 60 in different diameters whereby the second pin 60 is designed to be a shear pin (i.e., a mechanical fuse) so that should any of the arms 48-53 strike an object which is not likely to be broken by contact, the arms 48-53 can at least partially rotate out of the way to reduce the likelihood of serious damage and/or breakage of the arms 48-53 or pads 66, 68 or housing wall 44 or deflectors 38 or shelves 40, 41, 42 which are likely to be made of a relatively high strength steel and/or other materials), and therefore, when rotating at 100 meters per second or more could create a significant hazard particularly if they might puncture through the housing wall 44. Pads such as pads 66, 68 may also be broken off and then by contacting such structure be more likely to inflict internal damage to the components of the pulverizer 10. Accordingly, pulverizer 10 of some embodiments has "fail safe" arms which preferably rotate out of the way when encountering a force which exceeds a predetermined amount (some fraction of an anticipated breakage force, such as ½, ⅓, etc.).

Also, while other prior art designs use arm pads, such as Canadian Patent Application No. 2,147,666, these arm pads extend forward of a front face such as face 70 so that a radially inwardly directed surface 72 of the arm pad 74 would tend to catch material as it might be being shed off of front face 70 as the material passed radially outward due to the radial spinning nature of the device. This proved to be a problem as a way to wrap some items like textiles.

Figure 3:
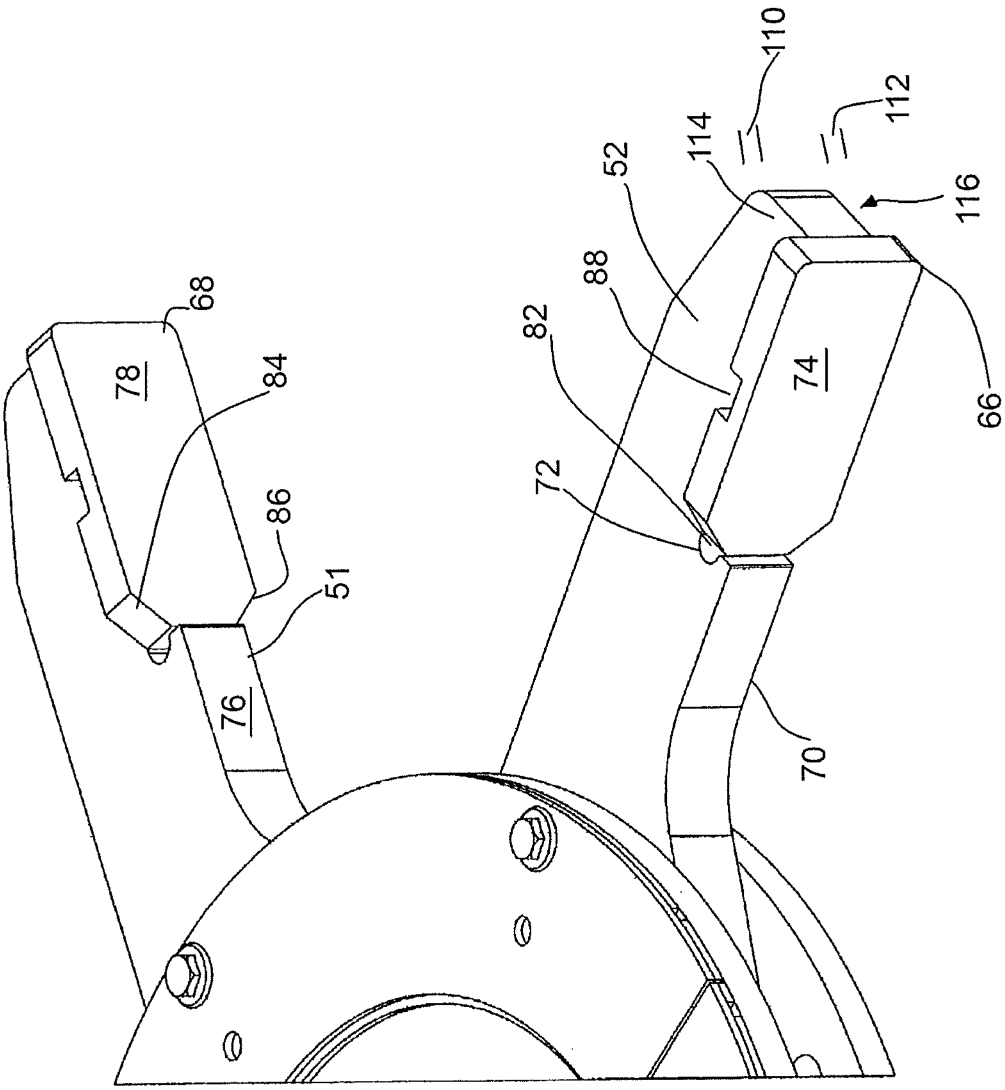
FIG. 3 is a detailed view of one of the arms with the arm pads installed as shown in FIGS. 1 and 2.

Accordingly, the applicant has provided two embodiments shown in FIG. 3, namely, a first embodiment with the arm 52 having a front face 70 from which a front face 74 of the arm pad 66 is recessed relative thereto such as spaced by toe 80 or otherwise with the radially inwardly directed face 72 possibly being received at least partially within recess 82 to assist in preventing the hang up of materials on the arm pad 74. Recess 82 may assist in relieving stresses and/or provide other benefits.

With arm 51, the front face 70 of the pad 68 is shown being coplanar with the front face 76 with the arm 51. This design feature, if implemented, also reduces the likelihood of hang up or wrapping. In addition, the radially inward face 84 of the arm pad 78 is shown as being angled in nature (at the top and bottom) so that should material contact those surfaces, the material can then go up and away from the angled portion 84 and down and away from the downward angled portion 86. These angles are shown at approximately 45 degrees but other angles could be utilized with other embodiments.

Additionally, arm pads 66, 68 are shown with a vertical groove 88 which is received on shoulder 90 shown in FIG. 2 along with post 92 and 94 which received the corresponding bores which are not shown on the rear side of arm pads 74, 70 as well as connector shown as screws 96, 98 which are shown as being directed through bores 100, 102 in arm 52 to then connect into the reverse side of arm pad 74, 78 as would be understood by those of ordinary skill in the art. This design can also reduce a likelihood of material being hung up on arm pads as can happen with prior art construction.

Figure 6:
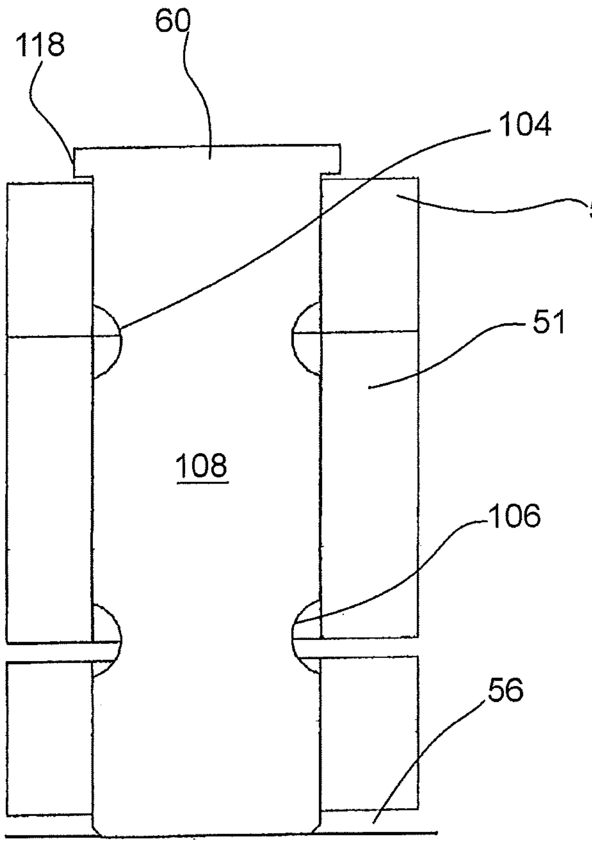
FIG. 6 is a cross sectional view taken along the line B-B of FIG. 3.

The pin design of first and second pins 58, 60 can be used with many embodiments. The second pin 62 can be manufactured to shear before the first pin 58 and before the possibility of damaging arm 48-53 and/or pads 74, 78 such as by having a small diameter and also having circumferential grooves 104, 106. FIG. 6 shows a presently preferred embodiment of the present invention of the second pin 60 which could take on other constructions. In this construction as it is configured, somewhat akin to a mechanical fuse in that first and second circumferential grooves 104, 106 can provide a failure location of the second pin 60 so that if shears such as at either of those locations and/or other locations through shaft 108 of the pin 60 so that the arm, such as arm 51 can then rotate about first pin 58 as an axis of rotation out of the way of a difficult object which might otherwise create extreme issues internal to the pulverizer 10 such as breaking off at least portions of the arms 48-53 and/or arm pads 66, 68 contact such. The second pin 60 is thus designed to fail at a predetermined force (stress) value. There are other mechanical fuse and/or friction systems which could be utilized other than this so that the arms rotating at roughly 200 miles per hour and with the pads 68, 70 possibly rotating at roughly 300 miles per hour do not create any significant damage to the pulverizer 10 when contacting a particularly difficult object to pulverize. The second pin 60 can shear through at a predetermined force which is designed to be less than a failure force on the arms 48-53 or arm pads 68, 70, such as about ½ or less.

It is not the arms 48-53 or even the pads 68, 70 which preferentially contact most of the material to be ground, but the vortices themselves which are created with air flow coming off of the arms 48-53 and/or pads 68, 70 as directed at least partially by deflectors 38 and shelves 40, 41, 42 which create the airflow within the pulverizer 10 for many embodiments.

Additionally, the arm pads 66, 68 are also shown having a predetermined height 110, 112 above and below the upper surface 114 and the lower surface 116 of the arm 52. This additional thickness above and below the arm 52 is believed to provide larger vortices for at least some embodiments while reducing wind resistance of having the arm 48-53 have a larger cross section. The heights 110, 112 with the height of the arm 52 is preferably at least about 150% of the height of the arm 52, if not twice that distance.

Figure 4:
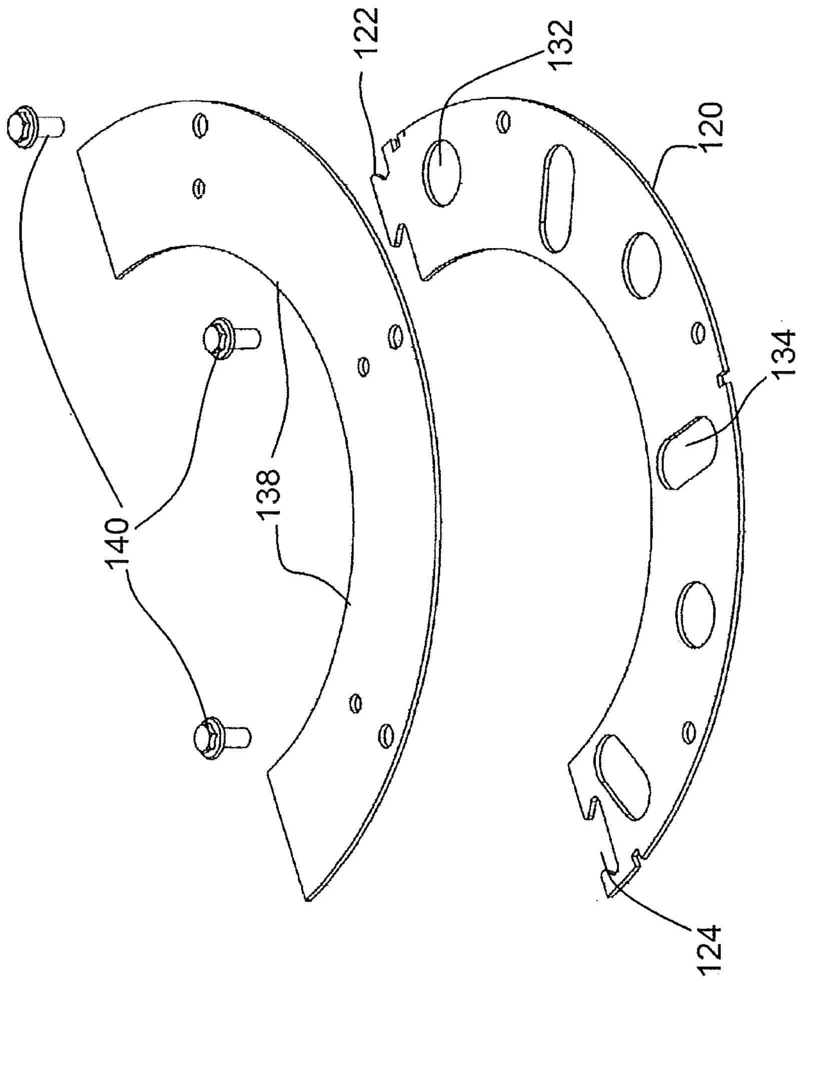
FIG. 4 is a top perspective exploded view of a portion of the arm retainer system removed from the arms and shaft for clarity.

When assembling the arms 48-53 to the shaft 12, one of the first and second plates 54, 56 is preferably placed on the shaft 12 with the arms 48-53 placed in relation thereto along with the second of the first and second plates 54, 56 and the pins 58, 60 can then be placed in position. With this construction, possibly such as with the plates 54, 56 being wedged into place or otherwise secured to the shaft 12 as would be understood by one of ordinary skill in the art, the heads of the pins 58, 60 illustrated as pin head 118 in FIG. 6 overlapping a top of top plate 54 can then be covered with one of a first and second spacing plates illustrated as first spacing plate portion 120 in FIG. 4 shown with male extension 122 and female receiver 124 with the second cover portion being similarly constructed thereto with the first male portion 122 of a first portion 120 can be received in a female portion 124 of a second similarly constructed cover portion 128 as would be understood from the drawings and with reference to FIG. 2. In fact, a first male portion 126 of the second spacing portion 128 is illustrated along with a female portion 130 with the first portion 120 not installed. This construction can provide a secure ring for the spacing portions 120, 128 while also being easy to assemble about shaft 12. The puzzle construction of male/female portions 122, 124 provides a ring of interlocking portions. One will observe that the bores 132 for receiving first pins they only have a diameter at or slightly greater than the head of the first pin 52 while the bore is illustrated as an elongated slot 134 for receiving a second pin 60 so that either of the two positions illustrated can be selected for raking of the arms 48-53.

With the spacing plate installed (with portions 120, 128) (or more), cover plates illustrated as first cover plate 136 and second cover plate 138 and/or others can then be installed to cover the heads 102 of the pins 58, 60. Connecting bolts such as bolts 140 can secure the cover portions 136, 138 through the spacing portions 120, 128 to the upper or first plate 54.

The arms 48-53 could be made of S7 steel or other appropriate steel material. AR steel could be utilized (or another impact resistant material) for the pads 70, 74 or even the arms 48-53 in various other embodiments. Still other embodiments may have various materials selected for the housing, deflectors 38, shelves 40, 41, 42 and/or other components.

Figure 7:
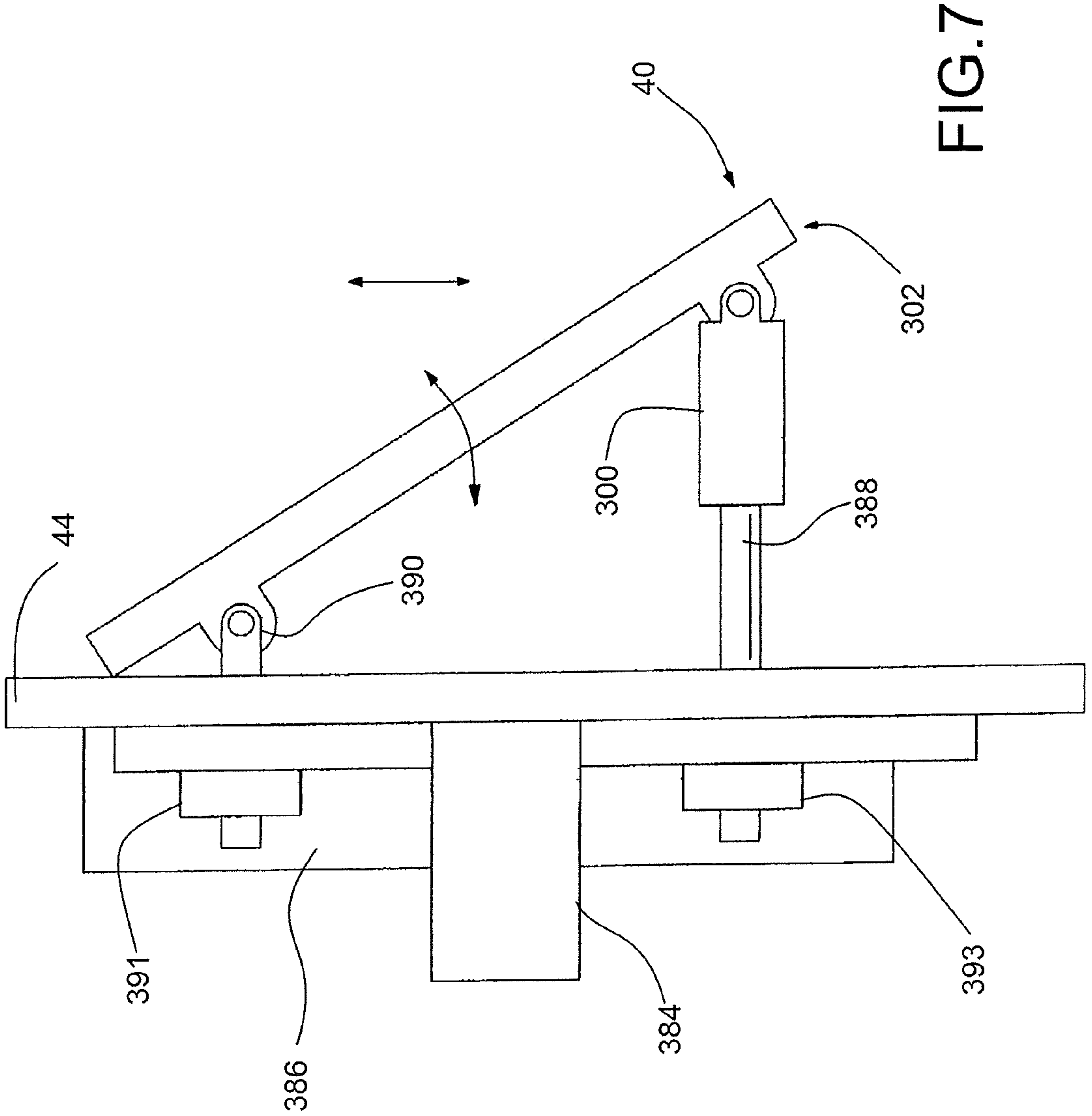
FIG. 7 is a cross-sectional detailed exploded view of detail A shown in FIG. 1.
Figure 8:
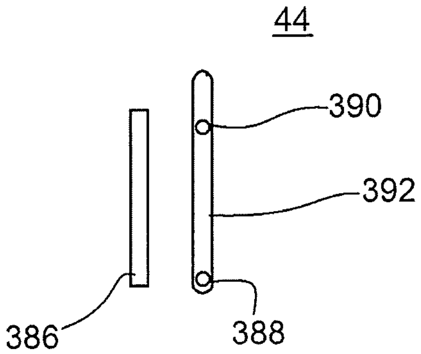
FIG. 8 is a plan view of the adjustable shelf of a portion of the mechanism shown in FIG. 2 from outside the housing of the pulverizer.
Figure 9:
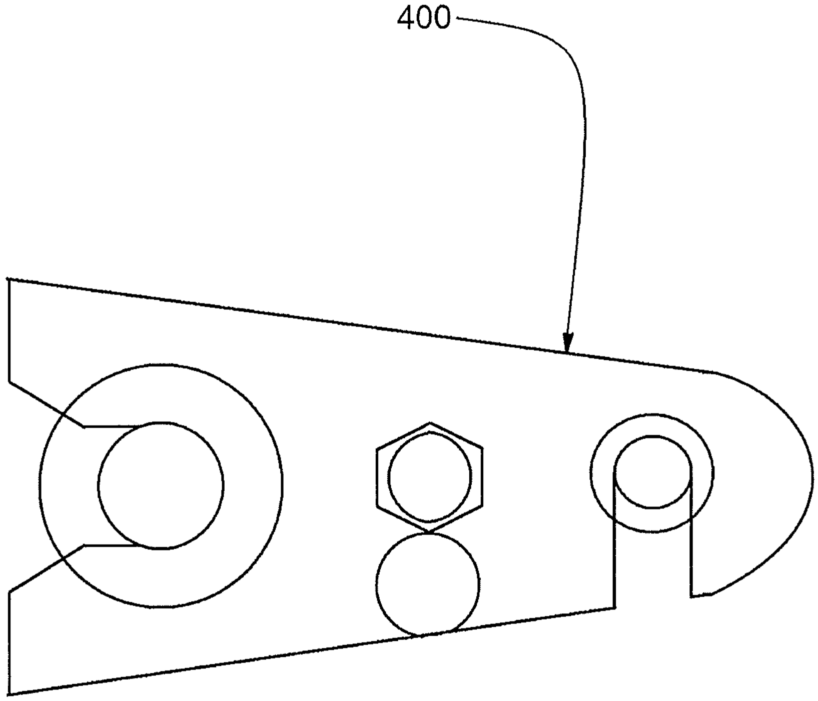
FIG. 9 is a top plan view of an alternatively preferred embodiment of a portion of the arm retainer system shown in FIG. 4 above.

In order to be able to address the shape of internal vortices, it may be that any of the shelves such as shelves 40, 41 and 42 and/or others are elevationally adjustable. FIG. 7 provides a first preferred embodiment of the present invention in which elevational adjustment of the shelf 40 may be achieved such as by driving carriage 384 along track 386 so that bolts 388, 390 can travel along slot 392 in wall 44 as shown in FIG. 8 in an elevational manner. Of course, the bolts 388, 390 could be connected to nuts 391, 393 on the outside of housing 22 of pulverizer 310 as well for elevation adjustment. A plate 396 may be useful to cover remaining portions of slot 392 in wall 44 and for which are not directly covered by the nuts such as a first nut 391 illustrated. Carriage 384 may be manually moved, if used, as it may be possible to omit carriage 384 and/or track 386 for some embodiments.

In addition to elevation adjustment, it may be possible to change the relative angle of the shelves such as by having the ability for carriage 384 or other component to be able to rotate the post 388 relative to receiver 300 for the ability to pull in the bottom end 302 relative to the top end 304 closer to or farther away from wall 44. Of course, other embodiments may have other constructions and without additional movement of the shelf, such as shelf 40, in other ways as well. Furthermore, any of the shelves, whether it be shelf 40, 41 and/or 42, could be adjustable in a similar manner. Furthermore, deflectors such as deflector 38 may also be adjustable in either angular relationships and/or distance internal from the wall 44 of the pulverizer 10.

Referring back to FIG. 1, the shelves 40, 41, 42 may be adjustable elevationally manually and/or possibly automatically with a processor 26. It may be that for different types of throughput, the shelves are set to a specific position which may be different for various throughput of waste. Accordingly, for at least in some embodiments not only is the elevational height of shelves such as shelves 40, 41 and 42 adjustable as well as the speed of the shaft 12, but possibly also the amount of vacuum and/or pressure internal to the pulverizer 10 as well as the rate of flow into the inlet 14 of the waste product.

By contrasting such variables, it has been discovered that the input and output can be increased roughly 20% while providing a consistent power consumption by motor 16 for at least some waste streams. This could be described as increasing the efficiency by 20% by adjusting the position or height of the shelf 40 (along with either or both of 41 and 42) to change the vortices within the housing 22 on at least one level.

A pulverizer 10 can be constructed to have a head 24 with an input port 26, a bottom 23 with a discharge port 25, and a housing 22 extending intermediate the head 24 and the bottom 23, said housing 22 having a vertically extending rotating shaft 12 with a plurality of arms 48, 49, 50, 51, 52, 53 extending from hubs 32, 34, 36 connected to the shaft 12 thereby reducing input such as particulate 30 from a larger to a smaller size from the input port 26 to the discharge port 25 with the rotation of the arms 48-53 in the housing.

At least some of the arms 48-53 can be canted relative to the hub 32, 34, or 36 to which they are connected at a first connection position whereby they form an angle between 5 and 90 degrees relative to a radian 64 extending through the arm 51. Some embodiments may provide a first connection position with at least some of the arms are angled between 5 and 30 degrees relative to the radian 64 extending through the arm 51. Some embodiments may have a second connection position at the hub 32, 34 or 36 whereby when in the second connection position, the angle of the arm 51 relative to the radian 64 is different than when in the first connection position. FIG. 2 illustrates the arm 53 in the second connection position, as illustrated in broken lines. None of the prior art constructions are believed to have an ability to change an angle of the arm 51 relative to a radian extending through the arm 51 (i.e., be multi-angular). While some embodiments have canted arms, others do not require such a feature.

Some pulverizers 10 provide a mechanical fuse, such as by using first and second pins 58, 60 retaining at least some of the arms 51 in a first connection position whereby if a predetermined force is reached, then at least some of the arms 51 release without breaking such as by having the second in 60 release, i.e., possibly by shear, thus allowing the arm 51 to rotate about the first pin 58. The pins 58, 60 and/or other connections of the arms 48-53 to the hubs can be covered with a coverplate, such as one having first and second portions interlocking with a puzzle connection on the hub 32, 34 or 36. Additionally, some arms 48-53 can be retained to hubs 32, 34 or 36 in a sandwich style configuration, such as one having the arms 48-53 connect between the first and second sandwich halves to the shaft 12.

Additionally some pulverizers 10 can have arms with improved pad constructions. Instead of sticking out in front of the front face of the arms like prior art constructions, the arm pads 66 have a front face 74 which can be one of either coplanar with the front face 70 of the arms 52 or recessed relative thereto. The pads 66 can also be manufactured to be higher (i.e., have a height greater than a height of the arms 52), such as at least about 150 percent, if not up to about 300 percent for at least some embodiments. Additionally, some arm pads 66 are angled at a radially inner position of the pad 66 to increase in height proceeding radially outwardly to assist in shedding material off the pad 66 which might otherwise be entangled thereon.

Still these, or other pulverizers 10 have shelves 40, 41 or 42 connected to the housing 22 which are positionally adjustable, such as elevationally adjustable within the housing 22 and/or angularly adjustable within the housing 22. Some of these type pulverizers 10 can have the positioning or adjustment of the shelves 40, 41 or 42 automatedly controlled with a processor 26. For some of these embodiments, the processor 26 can adjust the speed of the rotation of the shaft 12 along with the shelf position to increase efficiency of output relative to energy consumption, some embodiments have been able to achieve up to a 20% increase in efficiency.

Some embodiments may provide a pulverizer 10 constructed to have a head 24 with an input port 26, a bottom 23 with a discharge port 25, and a housing 22 extending intermediate the head 24 and the bottom 23, said housing 22 having a vertically extending rotating shaft 12 with a plurality of arms 48, 49, 50, 51, 52, 53 extending from hubs 32, 34, 36 connected to the shaft 12 thereby reducing input such as particular 30 from a larger to a smaller size from the input port 26 to the discharge port 25 with the rotation of the arms 48-53 in the housing. The arms 48-53 may or may not be canted as described herein for some embodiments.

At least some of the arms 52 may have pads 66 connected to the arms whereby the pads 66 have a front face 74 and the arms 52 have a front face 70, both in the direction of rotation, and the front face 74 of the pads 66 is one of (a) coplanar with the front face 70 of the arms 52 and (b) recessed relative thereto. These pads 66 could also extend up to or more than 150 percent of a height of the arm 54 for some embodiments.

Some embodiments may provide a retaining plate 400 to be used (one per pin pair 58, 60) possibly instead of jigsaw or puzzle male/female portions 122, 124. In an event of retainer fastener failure, shaft angular velocity and/or retaining plate inertia, both designs can use retaining pins 58, 60. Six retaining plates 400 would be used with the embodiment illustrated.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A pulverizer for size-reducing a material comprising:

a head having an input port;

a bottom having a discharge port;

a housing extending between the head and the bottom;

a rotatable shaft extending vertically within the housing;

a plurality of hubs connected to the rotatable shaft, wherein each of the plurality of hubs comprises a first plate and a second plate, wherein each of the first plate and the second plate encircles the rotatable shaft;

a plurality of arms respectively coupled to the plurality of hubs between the first plate and the second plate by first pins, wherein when the rotatable shaft is rotated, the plurality of arms rotate to generate vortices inside the housing;

a plurality of mechanical fuses each comprising a second pin, wherein the first pin pivotably couples and the second pin releasably couples one of the plurality of arms to one of the plurality of hubs between the first plate and the second plate of the one of the plurality of hubs to retain the one of the plurality of arms in a first position relative to the one of the plurality of hubs, the second pin being configured to release the one of the plurality of arms and allow the one of the plurality of arms to rotate between the first plate and the second plate about the first pin into a second position relative to the one of the plurality of hubs when the one of the plurality of arms is subjected to a force equal to or higher than a predetermined force; and a first spacer plate and a second spacer plate each having a female end and a male end, wherein the female end and the male end on the first spacer plate are configured to interlock with the male end and the female end, respectively, on the second spacer plate, the first and second spacer plates being configured to interlock around the rotatable shaft adjacent to the first plate and the second plate.

2. The pulverizer as claimed in claim 1, wherein when the one of the plurality of arms is positioned in the first position, the second pin prevents the one of the plurality of arms from rotating relative to the one of the plurality of hubs about the first pin.

3. The pulverizer as claimed in claim 1, wherein the second pin comprises a shear pin which is breakable when the one of the plurality of arms is subjected to the force equal to or greater than the predetermined force to allow the one of the plurality of arms to rotate relative to the one of the plurality of hubs.

4. The pulverizer as claimed in claim 3, wherein the shear pin has a diameter which is smaller than a diameter of the first pin.

5. The pulverizer as claimed in claim 3, wherein the shear pin has one or more circumferential grooves defining a failure location along the shear pin.

6. The pulverizer as claimed in claim 5, wherein the shear pin has two circumferential grooves.

7. The pulverizer as claimed in claim 3, wherein the first one of the plurality of pins extends through the one of the plurality of arm along an axis of a first segment of the one of the plurality of arms extending outward from the one of the plurality of hubs, and the shear pin extends through the one of the plurality of arms offset from the axis of the first segment.

8. The pulverizer as claimed in claim 7, wherein the one of the plurality of arms comprises a second segment that is angled at an angle of more than 90 degrees relative to the first segment.

9. The pulverizer as claimed in claim 1, wherein the plurality of mechanical fuses break at the predetermined force, and the predetermined force is lower than a failure stress value of the one of the plurality of arms.

10. The pulverizer as claimed in claim 9, wherein the predetermined force is less than ½ of the failure stress value of the one of the plurality of arms.

11. The pulverizer as claimed in claim 9, wherein the predetermined force is equal to ½ of the failure stress value of the one of the plurality of arms.

12. The pulverizer as claimed in claim 9, wherein the predetermined force is equal to ⅓ of the failure stress value of the one of the plurality of arms.

13. The pulverizer as claimed in claim 1, wherein the one of the plurality of arms comprises a first segment extending outward away from the one of the plurality of hubs and a second segment oriented at a non-zero angle relative to the first segment, wherein the second segment is coupled to the one of the plurality of hubs.

14. The pulverizer as claimed in claim 13, wherein in the first position, an axis of the first segment of the one of the plurality of arms extends from the one of the plurality of hubs at a canted angle being between 5 and 30 degrees in the direction of rotation relative to a radian of the rotor extending through the first segment of the one of the plurality of arms.

15. The pulverizer of claim 14, wherein the one of the plurality of arms is configured to move from the first position into a third position having a second canted angle relative to the radian different than when in the first position, wherein the one of the plurality of hubs has a first bore and a second bore, wherein the shear pin extends through the first bore when the one of the plurality of arms is in the first position, and the shear pin extends through the second bore when the one of the plurality of arms is in the third position.

16. A hub assembly for a pulverizer configured to size reduce a material, the pulverizer including a housing and a rotatable shaft extending through the housing, the hub assembly comprising:

a hub connectable to the rotatable shaft, the hub comprising a first plate and a second plate, wherein each of the first plate and the second plate encircles the rotatable shaft;

each of a plurality of arms secured to the hub between the first plate and the second plate by a first pin; wherein when the rotatable shaft is rotated, the plurality of arms rotate to generate vortices inside the housing;

at least one mechanical fuse comprising a second pin releasably coupling at least one of the plurality of arms to the hub between the first plate and the second plate to retain the at least one of the plurality of arms in a first position relative to the hub, the second pin being configured to release the at least one of the plurality of arms and allow the at least one of the plurality of arms to pivot between the first plate and the second plate about the first pin into a second position relative to the hub when the at least one of the plurality of arms is subjected to a force equal to or higher than a predetermined force; and a first spacer plate and a second spacer plate each having a female end and a male end, wherein the female end and the male end on the first spacer plate are configured to interlock with the male end and the female end, respectively, on the second spacer plate, the first and second spacer plates being configured to interlock around the rotatable shaft adjacent to the first plate and the second plate.

17. The hub assembly as claimed in claim 16, wherein when the at least one of the plurality of arms is positioned in the first position, the second pin prevents the at least one of the plurality of arms from pivoting relative to the hub about the first pin.

18. The hub assembly as claimed in claim 16, wherein the mechanical fuse includes a shear pin which is breakable when the at least one of the plurality of arms is subjected to the force equal to or greater than the predetermined force to allow the at least one of the plurality of arms to pivot relative to the hub.

* * * * *